July 7, 1936.  G. LAVENBURG  2,046,472
ELECTRIC TOASTER
Filed Dec. 18, 1933   2 Sheets-Sheet 1

George Lavenburg
INVENTOR

BY
ATTORNEY

July 7, 1936.                G. LAVENBURG                2,046,472
                              ELECTRIC TOASTER
                            Filed Dec. 18, 1933          2 Sheets-Sheet 2

George Lavenburg
INVENTOR

BY

ATTORNEY

Patented July 7, 1936

2,046,472

UNITED STATES PATENT OFFICE 2,046,472

ELECTRIC TOASTER

George Lavenburg, New York, N. Y.

Application December 18, 1933, Serial No. 702,861

18 Claims. (Cl. 161—16)

This invention relates to new and useful improvements in electric toasters and particularly to a timing arrangement for toasters.

In my copending application Serial No. 664,493, filed April 5, 1933, I describe an electric bread toaster in which the timing of the toasting operation is controlled by an electric motor delivering, through the agency of an impeller and a steel ball, impacts to the operating mechanism of the toasting platform, and in response to said impacts the toasting platform is moved from its fully operated to its normal position.

In accordance with the present invention, the timing of the toasting platform is controlled solely by electromagnetic means.

The nature of the invention will more clearly appear from a preferred embodiment thereof and the appended claims.

Figure 1:
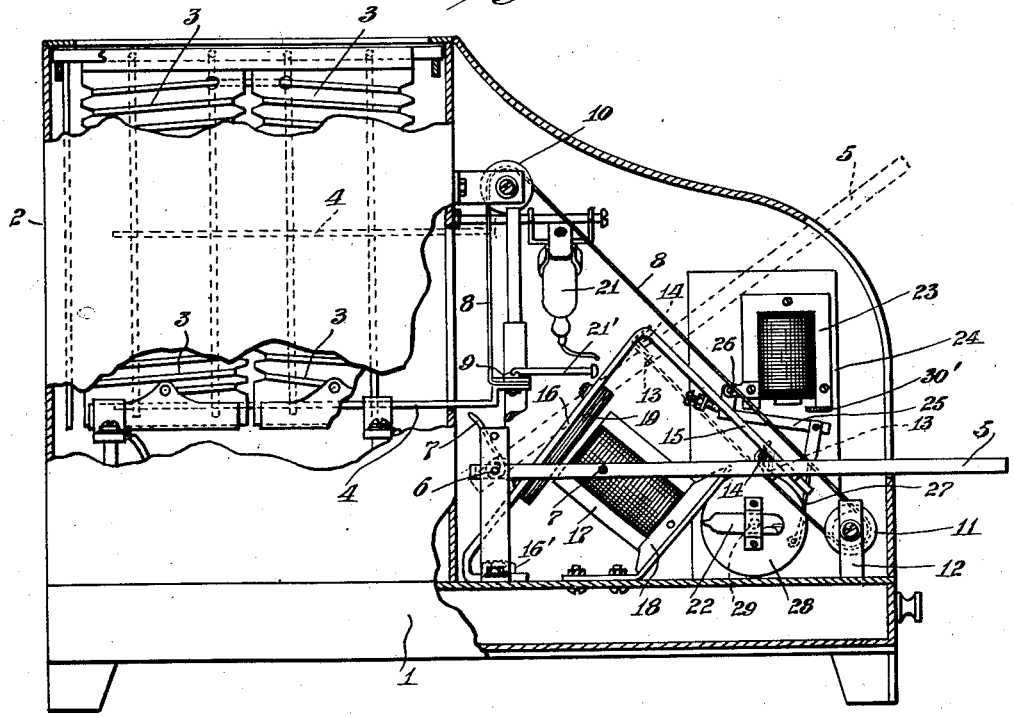
Figure 2:
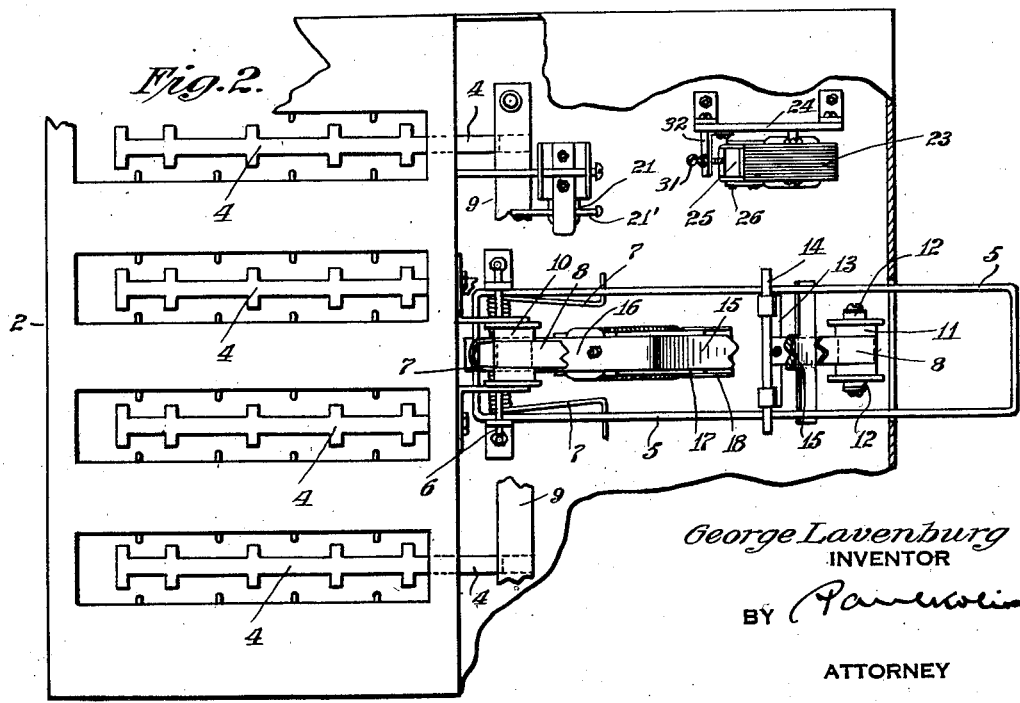

In the drawings, Fig. 1 is a side elevation of a toaster embodying the invention;

Fig. 2 is a top plan view; and

Figure 3:
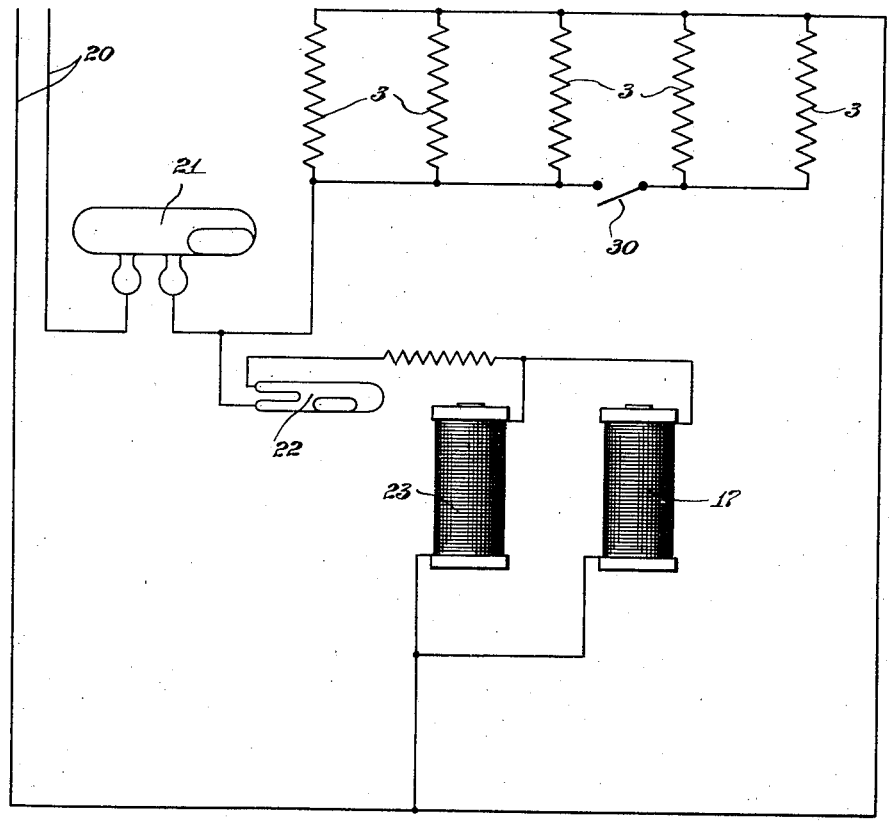

Fig. 3 the circuit diagram of the toaster and timing mechanism.

I is the base of the toaster, 2 the toasting compartment or oven enclosing resistance elements 3 and a bread platform 4, by means of which slices of bread may be moved vertically with respect to the compartment.

When it is desired to make toast, slices of bread are inserted in the oven through slots provided in the top thereof. The slices of bread will rest on the platform 4 between adjacent resistance elements 3. Then two levers 5 are rotated downward around their pivot shaft 6 and against the tension of spring 7. As the levers 5 are moved downward, the bread platform 4 drops by gravity, drawing with it a cable 8, one end of which is attached to a plate 9 interconnecting the projecting ends of the bread platform 4. The cable passes over a roller 10 mounted on the side wall of the oven 2 and a roller 11 mounted in brackets 12 on the base 1. The other end of the cable 8 is attached to yoke 13 of L-shaped cross-section which rests on levers 5 by means of a rod or slider 14 riveted to the yoke 13. The yoke 13 and the slider 14 frictionally engage one leg 15 of a steel bar, the other leg 16 of which bends substantially at right angles with respect to 15 and is riveted to the base at 16¹. The frictional engagement between the slider 14 and the edge of yoke 13, and the inside surface of the steel bar 15, is such that considerable resistance is offered to displacement of cable 8. This resistance is overcome by the lowering of the bread platform, provided of course that the levers 5 are moved down, leaving slider 14 and yoke 13 free to travel downward. Once the yoke 13 is moved into its lowermost position, the tension of spring 7 exerted on slider 14 through the levers 5 is insufficient to move yoke 13 into the opposite direction and thus lift the bread platform unless the operator grasps the handles 5 and pushes them upward. In this manner the device can be manually moved from its toasting to its idle position.

An automatic means in the form of electromagnetic mechanism is also provided for performing this function. The automatic means consists of an electromagnet 17 mounted on base 1 by means of a bracket 18 and cooperating with an armature 19 preferably riveted to leg 16 of the above mentioned steel bar. When the magnet 17 is energized, it will attract its armature and flex the steel bar in a clockwise direction (as viewed in Fig. 1). When the magnet is deenergized then, owing to its resiliency, the steel bar will return to its original position. The back-and-forth movement of leg 15 with respect to slider 14 will permit the latter step by step to move up under the joint action of the motion of leg 15 and the motion of levers 5 caused by spring 7 and thus gradually lift the bread platform into its top position.

The circuit of the resistance 3 and the magnet 17 extends from one leg of the power lines 20 through a mercury switch 21 and thence through the resistance 3 in parallel back to the other leg of the line. A branch of this circuit extends through a second mercury switch 22 and the winding of magnet 17 back to the line, energizing magnet 17 and heating the resistances 3 when the mercury switch 21 is closed. As indicated in Fig. 1, the mercury switch 21 is pivotally mounted on the side wall of the oven 2 and it tends to tilt toward the closed position unless held open by a finger 21¹ projecting from the plate 9. As soon as the bread platform 4 is lowered, the switch 21 will tip over and close the above described circuit and maintain said circuit closed until the bread platform returns to its normal or uppermost position, whereupon finger 21¹ will tilt back the mercury switch to open the circuit. Two or more resistances 3 may be cut out by means of switch 30.

The opening and closing of the mercury switch 22 which controls the branch of the circuit, including magnet 17, is controlled by an electromagnet 23 mounted by means of a bracket 24 on base 1. This magnet is provided with an armature 25 pivoted at one end to the magnet frame at 26, the other end of the armature being free and adapted to fall by gravity and being connected by means of a link 27 with a drum 28 which may be oscillated around a shaft 29 and which carries the mercury switch 22. In the deenergized position of the magnet 23 the mercury switch 22 is closed and in the energized position of the magnet the drum 28, having rotated in a counter-clockwise direction, tilts the mercury switch 22 so as to open the circuit. The magnet 23 is connected in parallel with the magnet 17. Therefore, through the agency of mercury switch 22, it will operate as a buzzer alternately to close and open its own energizing circuit and that of magnet 17, as long as switch 21 maintains the main branch of the circuit closed.

Preferably, both magnets 17 and 23 have laminated cores and armatures. The magnet 23 has also a suitable abutment 30¹ interposed between its pole face and the armature 25. By means of the electrical and mechanical characteristics of magnet 23, and the shape and length of mercury switch 22, the timing of successive operations of magnet 23 may be fixed at will. The extent to which armature 25 is permitted to oscillate is controlled by means of a set screw 31 projecting through an angle piece 32 mounted on bracket 24.

What is claimed is:

1. In an electric toaster, an oven, electric heating elements associated with said oven, a bread platform, means for moving said platform in two opposed directions with respect to said oven, a circuit for said heating elements, a mercury switch controlled by said means and controlling said circuit, electromagnetic means for operating said means for moving said bread platform in one direction, and a second mercury switch jointly controlling with said first mentioned switch said electromagnetic means.

2. In an electric toaster, an oven, electric heating elements associated with said oven, a bread platform, means for moving said platform in two opposed directions with respect to said oven, a circuit for said heating elements, a mercury switch controlled by said means and controlling said circuit, an electromagnet for operating said means for moving said bread platform in one direction, and a circuit for said electromagnet including a second mercury switch and said first mentioned switch.

3. In an electric toaster, an oven, electric heating means associated with said oven, a bread platform, means for lowering said platform into said oven, a cable for raising said bread platform within said oven, a resilient bar, a spring pressed pivoted lever, a slider attached to the end of said cable and forced by said lever into frictional engagement with said bar, an electromagnet, an armature for said electromagnet fastened to said bar, and means for opening and closing the circuit of said magnet whereby said magnet will flex said bar and permit said slider to move with respect thereto.

4. In combination, a slider, an electromagnet, an armature therefor comprising a resilient bar having two legs, a spring pressed pivoted lever forcing said slider into frictional engagement with one of said legs, means for opening and closing the circuit of said magnet whereby said magnet will flex said bar and permit said slider to advance in one direction with respect thereto.

5. In combination, a timed element, an electromagnet, an armature therefor comprising a resilient bar having two legs, a spring pressed pivoted lever forcing said element into frictional engagement with one of said legs, timing means for opening and closing the circuit of said magnet whereby said magnet will flex said bar and permit said element to advance an allotted distance in a substantially predetermined time in one direction with respect thereto.

6. In combination, a slider, an electromagnet having a circuit and an armature, a bar moved by said armature, said slider being in frictional engagement with said bar, a spring pressed lever for holding said slider against displacement, and means for opening and closing the circuit of said magnet to attract and release said bar and permit said slider and lever to advance in one direction with respect thereto.

7. In combination, an electromagnet having a movable armature, an element responsive to said armature and rotatable in one direction when the magnet is energized and in the opposite direction when the magnet permits its armature to fall off by gravity, a mercury switch mounted on said element for controlling the circuit of said electromagnet, said mercury switch being tipped in one direction upon the energization of said magnet immediately to interrupt said circuit and in the opposite direction upon the deenergization of said magnet immediately to close said circuit, a timing means including a second electromagnet, a timed element controlled by said second electromagnet, a circuit for said second electromagnet including said mercury switch for gradually advancing said timed element, and means for holding said timed element in its advanced position.

8. In a device according to claim 7, a timing means including a second electromagnet, a timed element controlled by said second electromagnet, a circuit for said second electromagnet including said mercury switch for gradually advancing said timed element, and means for holding said timed element in its advanced position.

9. In combination, an electric circuit-controlling switch, a timing mechanism including an electromagnet having a circuit controlled by said switch, a flexible bar forming part of said mechanism, a slider in frictional engagement with said bar, means including said magnet for opening and closing the circuit of the magnet, means responsive to the opening and closing of said circuit for flexing said bar to move said slider, means for actuating said switch to open said circuit when said slider has travelled to a certain advanced position, and manually operable means for actuating said switch to close said circuit.

10. In an electric toaster, an oven, electric heating means associated with said oven, a movable platform having a normal and a plurality of advanced positions, means for moving said platform in one direction into any advanced position within said oven, an electromagnet having an armature, means for closing the circuit of said electromagnet, means including said armature for repeatedly opening and closing said circuit, and means responsive to the repeated closing and opening of said circuit for gradually moving said platform from any advanced position in the opposite direction out of the oven and back into the normal position.

11. In an electric toaster, an oven, electric heating means associated with said oven, a movable platform having a normal and a plurality of advanced positions, means for lowering said platform into any advanced position within said oven, an electromagnet having an armature, means including the armature for repeatedly opening and closing the circuit of said electromagnet, and means responsive to each energization and deenergization of said electromagnet for raising said platform from any advanced position.

12. In an electric toaster, an oven, electric heating elements associated with said oven, a bread platform, means for moving said platform in two opposed directions with respect to said oven, a circuit for said heating elements, a mercury switch operated upon the movement of said platform in one direction and controlling said circuit, electromagnetic means having a circuit and operating said means for moving said bread platform in one direction, and a second mercury switch for periodically making and breaking the circuit of said electromagnetic means.

13. In an electric toaster, an oven, electric heating means associated with said oven, a platform, a spring-pressed lever operable in two directions, a mechanical connection between said lever and platform for lowering said platform into said oven when said lever is operated in one direction, a resilient bar, a frictional coupling between said lever and said bar, an electromagnet, a circuit for said magnet, an armature for said magnet comprising said bar, and means for opening and closing the circuit of said magnet whereby said magnet will flex said bar and permit said lever to move in the other direction gradually to raise said platform in a direction out of said oven.

14. In combination, a spring-pressed lever, an electromagnet, an armature therefor comprising a resilient bar, a frictional coupling between said lever and said bar, means for opening and closing the circuit of said magnet whereby said magnet will flex said bar and permit said lever to advance in one direction with respect thereto.

15. In combination, a timed element comprising a lever, a spring normally tending to move said lever in one direction, an electromagnet, an armature therefor comprising a resilient bar, a frictional coupling between said lever and said bar, timing means for opening and closing the circuit of said magnet whereby said magnet will flex said bar and permit said lever to advance an allotted distance in a substantially predetermined time in one direction with respect thereto.

16. In combination, a timed element comprising a lever adapted to be moved from a normal to a plurality of advanced positions, a spring normally tending to move said lever towards its normal position, an electromagnet, a circuit for said magnet, an armature therefor comprising a resilient bar, a frictional coupling between said lever and said bar, timing means for opening and closing the circuit of said magnet whereby said magnet will flex said bar and permit said lever to advance from any advanced position in substantially predetermined times back to the normal position.

17. In combination, an electric circuit-controlling switch, a timing mechanism including an electromagnet having a circuit controlled by said switch, a flexible bar forming part of said mechanism, a spring-pressed lever, a frictional coupling between said lever and said bar, manually operable means including said lever for actuating said switch to close said circuit, means including said magnet for opening and closing the circuit of said magnet, means responsive to the opening and closing of said circuit for flexing said bar to advance said lever, and means for actuating said switch to open said circuit when said lever has advanced a predetermined distance.

18. In combination, an electric circuit-controlling switch, a timing mechanism including an electromagnet having a circuit controlled by said switch, a flexible bar forming part of said mechanism, a lever adapted to be moved from a normal to a plurality of advanced positions, a frictional coupling between said lever and said bar, manually operable means including said lever for actuating said switch to close said circuit, means including said magnet for opening and closing the circuit of said magnet, means responsive to the opening and closing of said circuit for flexing said bar to advance said lever from any advanced position, and means for actuating said switch to open said circuit when said lever has advanced back to the normal position.

GEORGE LAVENBURG.